(12) United States Patent
Abdi Taghi Abad et al.

(10) Patent No.: US 10,332,035 B1
(45) Date of Patent: Jun. 25, 2019

(54) SYSTEMS AND METHODS FOR ACCELERATING MODEL TRAINING IN MACHINE LEARNING

(71) Applicant: Capital One Services, LLC, McLean, VA (US)

(72) Inventors: Fardin Abdi Taghi Abad, Champaign, IL (US); Jeremy Goodsitt, Champaign, IL (US); Austin Walters, Savoy, IL (US); Reza Farivar, Champaign, IL (US); Mark Watson, Urbana, IL (US); Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/115,863

(22) Filed: Aug. 29, 2018

(51) Int. Cl.
*G06N 20/00* (2019.01)
*G06N 5/04* (2006.01)

(52) U.S. Cl.
CPC .............. *G06N 20/00* (2019.01); *G06N 5/048* (2013.01)

(58) Field of Classification Search
CPC ......... G06N 99/005; G06N 5/048; G06N 3/02
USPC ........................................................ 706/12
See application file for complete search history.

(56) References Cited

U.S. PATENT DOCUMENTS

| | | | | |
|---|---|---|---|---|
| 2014/0156566 | A1* | 6/2014 | Kabiljo | G06N 99/005 706/12 |
| 2015/0148953 | A1* | 5/2015 | Laurent | B25J 9/163 700/250 |
| 2017/0132528 | A1* | 5/2017 | Aslan | G06N 99/005 |
| 2018/0046926 | A1* | 2/2018 | Achin | G06N 99/005 |
| 2018/0129918 | A1* | 5/2018 | Wang | G06T 3/4046 |
| 2018/0307687 | A1* | 10/2018 | Natkin | G06F 17/3053 |
| 2018/0311510 | A1* | 11/2018 | Sjolund | A61N 5/103 |

* cited by examiner

*Primary Examiner* — Dave Misir
(74) *Attorney, Agent, or Firm* — Finnegan, Henderson, Farabow, Garrett & Dunner, LLP

(57) ABSTRACT

Systems and methods are provided for training a model using machine learning. An exemplary method may include providing, by the model in a training session, an action to an environment to receive feedback from the environment. The method may also include generating, by a behavior simulator, a plurality of predicted outcomes from the environment resulting from the action. The method may further include training the model, using at least a subset of the predicted outcomes, to generate a set of candidate models. The method may include receiving actual feedback from the environment and determining whether the actual feedback matches one of the predicted outcomes in the subset. Responsive to the determination that the actual feedback matches one of the predicted outcomes in the subset, the method may include using, in a new training session, the candidate model in the set corresponding to the matched predicted outcome.

20 Claims, 6 Drawing Sheets

SYSTEMS AND METHODS FOR ACCELERATING MODEL TRAINING IN MACHINE LEARNING

TECHNICAL FIELD

The present disclosure relates generally to the field of training models in machine learning. More specifically, and without limitation, this disclosure relates to systems and methods for accelerating model training by pre-training models in parallel using multiple predicted outcomes.

BACKGROUND

In reinforcement learning, an area of machine learning, a software model is trained to take actions in an environment so as to maximize a certain notion of cumulative reward. In a typical training process, the model generates an action, sends the action to the environment, and waits for the effect on or outcome from the environment resulting from the action through a feedback loop. The feedback can then be used to calculate a score, indicating a reward by taking the action, which can be incorporated into the model to improve the accuracy of taking further actions to maximize the score/reward.

In this typical training process, resources for training the model normally have to remain idle while waiting for the effect or outcome to be fed back from the environment before launching the next training task. Such idle time prolongs the total time required for training the model and results in slower training. In some cases, the effect of an action on the environment may take a long time to materialize (e.g., weeks or even months). Allowing the training resources to remain idle during such a long time may cause significant waste of computational power.

Thus, there is a need for systems and methods capable of utilizing the waiting period to accelerate the model training process.

SUMMARY

In one aspect, a system is provided for training a model using machine learning based on feedback from an environment. The system may include at least one processor and a storage medium. The storage medium may store instructions that, when executed by the at least one processor, cause the at least one processor to perform operations. The operations may include providing, by the model in a training session, an action to the environment to receive feedback from the environment. The operations may also include generating, by a behavior simulator, a plurality of predicted outcomes from the environment resulting from the action. The operations may also include training the model, using at least a subset of the predicted outcomes, to generate a set of candidate models. The operations may further include receiving actual feedback from the environment. The operations may further include determining whether the actual feedback matches one of the predicted outcomes in the subset. Responsive to the determination that the actual feedback matches one of the predicted outcomes in the subset, the operations may include using, in a new training session, the candidate model in the set corresponding to the matched predicted outcome.

In another aspect, a computer-implemented method is provided for training a model using machine learning based on feedback from an environment. The method may include providing, by the model in a training session, an action to the environment to receive feedback from the environment. The method may also include generating, by a behavior simulator, a plurality of predicted outcomes from the environment resulting from the action. The method may also include training the model, using at least a subset of the predicted outcomes, to generate a set of candidate models. The method may further include receiving actual feedback from the environment. The method may further include determining whether the actual feedback matches one of the predicted outcomes in the subset. Responsive to the determination that the actual feedback matches one of the predicted outcomes in the subset, the method may include using, in a new training session, the candidate model in the set corresponding to the matched predicted outcome.

In a further aspect, a non-transitory computer-readable medium is provided. The non-transitory computer-readable medium may store instructions executable by at least one processor to cause the at least one processor to perform operations for training a model using machine learning based on feedback from an environment. The operations may include providing, by the model in a training session, an action to the environment to receive feedback from the environment. The operations may also include generating, by a behavior simulator, a plurality of predicted outcomes from the environment resulting from the action. The operations may also include training the model, using at least a subset of the predicted outcomes, to generate a set of candidate models. The operations may further include receiving actual feedback from the environment. The operations may further include determining whether the actual feedback matches one of the predicted outcomes in the subset. Responsive to the determination that the actual feedback matches one of the predicted outcomes in the subset, the operations may include using, in a new training session, the candidate model in the set corresponding to the matched predicted outcome.

BRIEF DESCRIPTION OF THE DRAWINGS

The accompanying drawings, which are incorporated in and constitute a part of this specification, illustrate several embodiments and, together with the description, serve to explain the disclosed embodiments. In the drawings.

DETAILED DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts.

The present disclosure describes systems and methods for accelerating a model training process in machine learning. In some exemplary embodiments, a model subject to training may send an action to an environment to receive feedback from the environment. While waiting for the feedback, a behavior simulator may generate a plurality of predicted outcomes that are likely to be fed back (i.e. received) from the environment. The model may then be trained using some or all of the predicted outcomes to generate a set of candidate models. The training may be conducted in parallel to maximize the utility of training resources such as computational power that would otherwise remain idle. In some cases, the training may finish before the actual feedback is received from the environment. After the actual feedback is received, it may be determined whether the actual feedback matches one of the predicted outcomes. If so, then the candidate model trained using the matching predicted outcome may be readily used in a new training session. In this way, training tasks may be completed while the model is waiting for the actual feedback from the environment, thereby speeding up the overall training process. In some embodiments, the training of candidate models based on predicted outcomes may be performed beyond the current training step or session. For example, after the set of candidate models are generated, the behavior simulator may start predicting possible outcomes from the environment resulting from a new action, assuming that one or more of the candidate models is the actual model that would be used in the next session. Then a new set of candidate models may be trained corresponding to each "would-be" model, and so on as forth. This cascading processing may be performed through any number of levels, depending on the available computation resources. Of course, as the number of levels increases, the computational cost may also increase drastically, depending on the number of predicted outcomes in each level. Therefore, the balance between cost and benefits may be considered to prioritize certain parts of the cascade training.

Figure 1:
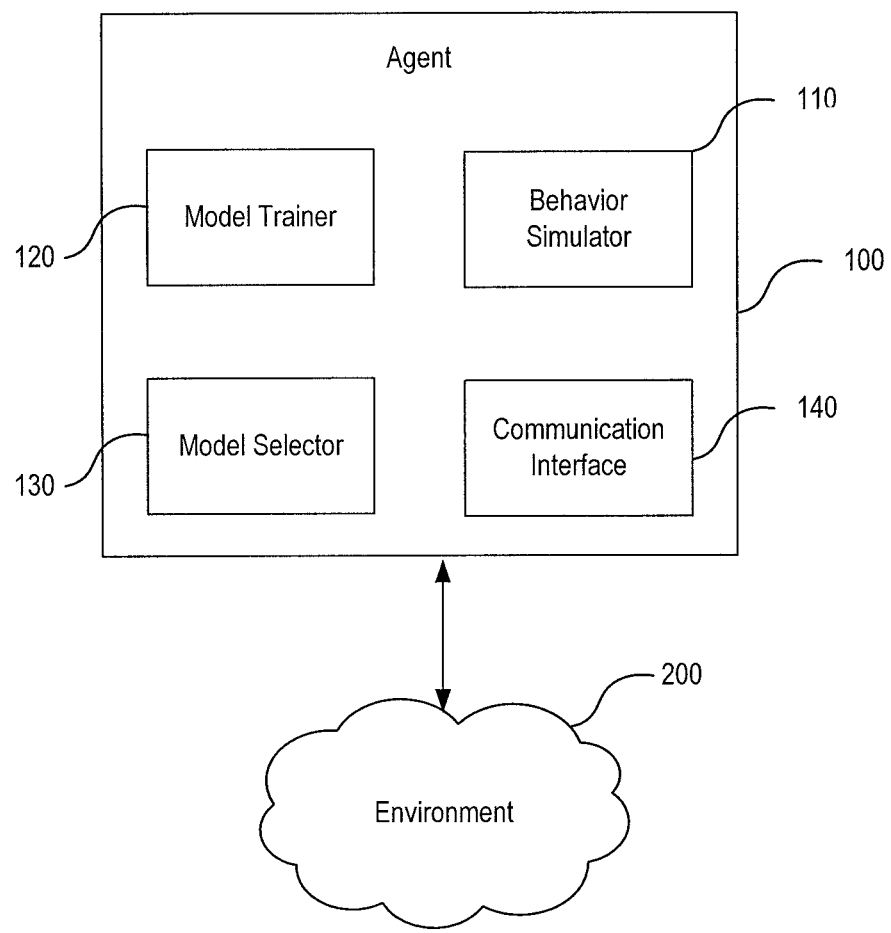
FIG. 1 is a block diagram of an exemplary model training system, consistent with the disclosed embodiments.

FIG. 1 shows a block diagram of an exemplary system 10 configured to train a model in machine learning, in which a method to accelerate the training process may be implemented, consistent with the disclosed embodiments. As shown in FIG. 1, system 10 may include an agent 100 and an environment 200. Agent 100 may include hardware, software, or a combination thereof, to practice aspects of the disclosed model training techniques. In some embodiments, agent 100 may be implemented using a computer system including one or more computers, such as server and/or workstation computers. Agent 100 may include one or more processors, including Central Processing Units (CPUs) that may have a single core or multiple cores, Graphical Processing Units (GPUs) that may have a single core or multiple cores, integrated circuits (ICs), chips, microprocessors, microcontrollers, Digital Signal Processors (DSPs), Field-Programmable Gate Arrays (FPGAs), or other types of processors. The computer system that implements agent 100 may be organized in a centralized or distributed manner. Components of agent 100 may be integrated or provided as discrete units or modules, and the components may be interconnected via one or more communication links and/or networks.

As shown in FIG. 1, agent 100 may include a model trainer 120, a behavior simulator 110, a model selector 130, and a communication interface 140. In some embodiments, multiple model trainers, behavior simulators, model selectors, or communication interfaces may be used. Communication interface 140 may include any type of communication devices, including one or more network adapters such as an Ethernet network adapter, a wireless network adapter, a fiber network adapter, etc., and may be configured to interface components of agent 100 with environment 200, such that components of agent 100 may communicate with environment 200. For example, agent 100 may, through one or more models running thereon, send actions to and receive feedback from environment 200 via communication interface 140.

Agent 100 may be configured to train one or more models using machine learning techniques. A model may include logical, mathematical, and/or statistical representations of certain factors, parameters, and/or relationships that may make decisions based on certain inputs. For example, a model may include a table of parameters, a neural network, an algorithm, etc. A model may be trained using training data to improve the decision making capability. For example, the training may take place by providing an action (e.g., denoted as A1) to environment 200 and receiving outcome(s) or effect(s) resulting from the action via feedback. Based on the outcome(s) or effect(s), a reward may be determined indicating the effectiveness of the action. Then, the model may be refined or trained based on the action-reward relationship such that the model may provide subsequent actions that maximize the reward. In practice, model training may be performed in a series of steps or sessions, in which the model may be refined or adjusted in each step/session. Traditionally, agent 100 has to wait to receive actual feedback from environment 200 before it can train the model, leaving training resources such as computational infrastructure idling during the waiting period.

Figure 2:
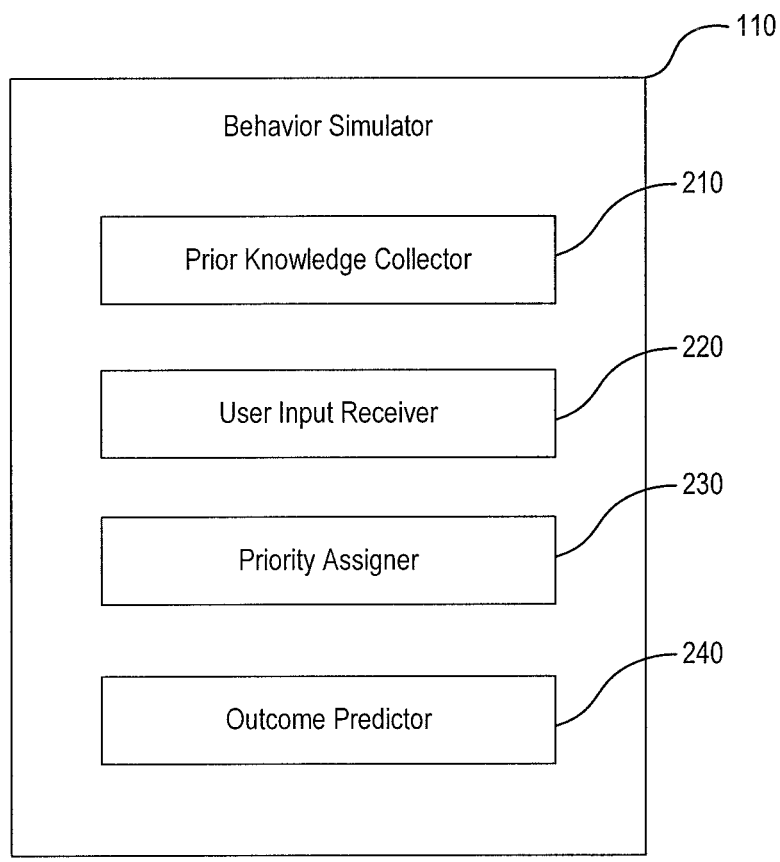
FIG. 2 is a block diagram of an exemplary implementation of a behavior simulator, consistent with the disclosed embodiments.

In this disclosure, systems and methods are provided to utilize the waiting time to accelerate the training time. This can be achieved by, for example, using behavior simulator 110 to simulate the reaction of environment 200 to the action (e.g., A1) sent thereto by a model (e.g., M1) subject to training. FIG. 2 shows an exemplary implementation of behavior simulator 110. As shown in FIG. 2, behavior simulator 110 may include a prior knowledge collector 210, a user input receiver 220, a priority assigner 230, and an outcome predictor 240. In some embodiments, multiple knowledge collectors, user input receivers, priority assigners, or outcome predictors may be used.

Prior knowledge collector 210 may be configured to collect prior knowledge of environment 200, such as a relationship between actions and feedback obtained from prior training sessions. Based on the prior knowledge, a model of environment 200 (e.g., denoted by EM, not to be confused with model M1 to be trained) that simulates the behavior of environment 200 may be built. In another example, behavior simulator 110 may receive user input from user input receiver 230 regarding prior knowledge of environment 200 as well as possible outcomes resulting from an action (e.g., A1). Behavior simulator 110 may then simulate the behavior of environment 200 based on user inputs.

Behavior simulator 110 may, using outcome predictor 240, predict the possible outcomes resulting from an action (e.g., A1) sent to environment 200. For example, outcome predictor 240 may generate a plurality of predicted outcomes based on the probabilities of these outcomes. In other words, the prediction may take the form of a number of (e.g., k) likely outcomes based on their likelihood. In some embodiments, outcome predictor 240 may generate the k most likely outcomes as the predicted outcomes (e.g., denoted as S1,1 to S1,k). The number, k, of likely outcomes may be controlled either by predefining a value of k such that no more than k most likely outcomes are generated. Additionally or alternatively, the number k may be controlled by predefining a likelihood threshold such that, for example, as long as a likelihood of an outcome is higher than the threshold, the outcome can be generated as a predicted outcome.

In some embodiments, priority assigner 230 may assign priority to the predicted outcomes such that a subset of the predicted outcomes may be used to train model M1. The predicted outcomes included in the subset may be determined based on the priority assigned by priority assigner 230. In one example, the priority may indicate a likelihood that the action (e.g., A1) generates the predicted outcome. In other words, the priority may correspond to the likelihood such that the most likely one or more predicted outcomes may be selected for training purposes. In another example, the priority may indicate an expected value generated by training the model using the predicted outcome. For example, the expected value may indicate an expected economic value that would be generated by training the model using the predicted outcome. In another example, the expected value may indicate an expected training time reduction by training the model using the predicted outcome. This may be one way to balance the cost and benefit of conducting pre-training based on predicted outcomes. On one hand, training model M1 using more predicted outcomes would increase the chance that the actual outcome matches one of the predicted outcomes, thereby realizing the goal of accelerating the modeling training process. On the other hand, using more predicted outcomes to conduct pre-training may mean more cost associated with the additional computational resources required to train the model. At a certain point, the marginal benefit of conducting more pre-training may be outweighed by the added cost. In this case, only those predicted outcomes that may generate positive expected values, either individually or accumulatively, may be selected for training the model M1.

In some embodiments, outcome predictor 240 may generate one or more predicted outcomes based on a conditional probability. The conditional probability may represent a likelihood environment 200 generates the predicted outcome(s) resulting from the action (e.g., A1), based on the knowledge of environment 200 obtained from one or more prior training sessions. Outcome predictor 240 may calculate the probability of each possible outcome as a conditional probability given the knowledge about environment 200 collected from prior training session(s). For example, without any prior knowledge of environment 200, an approval rate of a new user interface design may be 50%, similar to flipping a coin. However, if prior knowledge shows that a similar user interface design received an 80% approval rate, then the probability that the new user interface design would also be approved by customers may be different from 50%. In each new training session, outcome predictor 240 may take into account the knowledge gathered from prior training sessions, and use the knowledge to predict possible outcomes based on conditional probabilities.

Returning back to FIG. 1, after behavior simulator 110 generates multiple predicted outcomes, model trainer 120 may train model M1 using at least a subset of the predicted outcomes (e.g., ST1,1 to ST1,j, j<=k) to generate a set of candidate models (e.g., MC1,1 to MC1,j). As discussed above, the subset of predicted outcomes may be selected based on priorities associated with the predicted outcomes.

Figure 3:
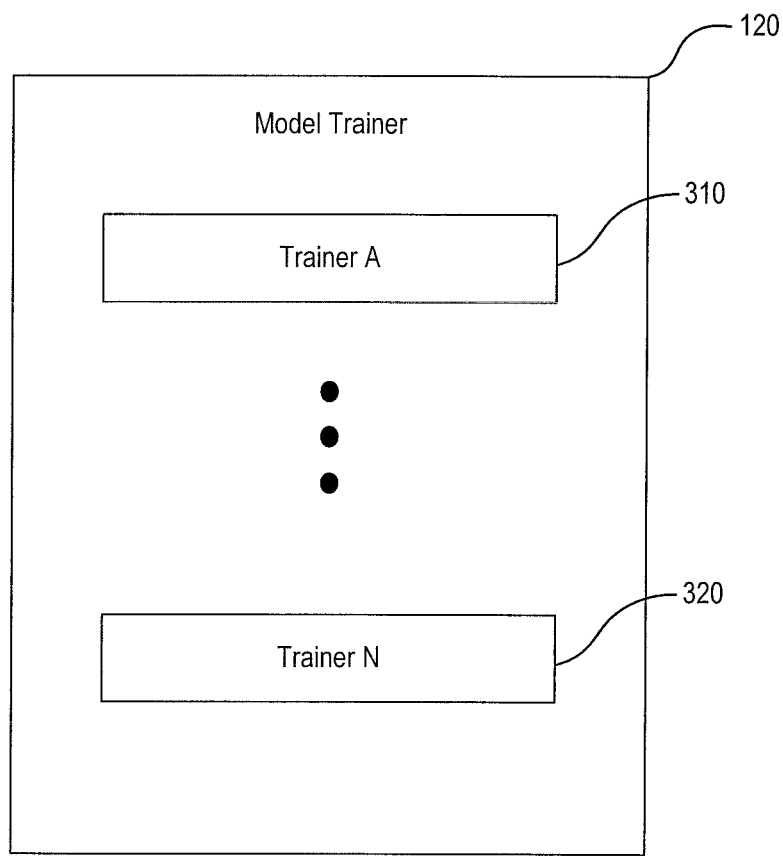
FIG. 3 is a block diagram of an exemplary implementation of a model trainer, consistent with the disclosed embodiments.

FIG. 3 shows an exemplary implementation of model trainer 120, consistent with disclosed embodiments. As shown in FIG. 3, model trainer 120 may include a plurality of trainers 310-320 that may be capable of training model M1 using the predicted outcomes. In some embodiments, the plurality of trainers may train model M1 in parallel, in which each trainer may launch a training task using one of the predicted outcome. The input to each trainer may be M1 and a predicted outcome ST1,i (1<=i<=j), and the output may be a candidate model MC1,i. In some embodiments, the training of the model M1 using multiple predicted outcomes may be completed before an actual outcome is fed back from environment 200.

In some embodiments, model trainer 120 may conduct model training in a cascade fashion. For example, after candidate models MC1,1-MC1,j are generated, for each candidate model MC1,i, a new action A2 may be formulated as an input to environment 200 in a new training session. Because the actual outcome of A1 has not been received from environment 200, instead of sending action A2 to environment 200, agent 100 may simulate the behavior of environment 200 using behavior simulator 110 to provide predicted outcomes S2,1_(MC1,i) to S2,k_(MC1,i) for each candidate model MC1,i. Then, based on a selected group of predicted outcomes, model trainer 120 may train a set of candidate models MC2,1 to MC2,ji (at the $2^{nd}$ level) for each candidate model MC1,i (at the $1^{st}$ level). In this manner, each candidate model in one level may yield a set of candidate model in the next level. All the candidate models may be stored for selection as an actual trained model when the predicted outcome used to train that candidate model matches the actual outcome fed back from environment 200.

The selection of a model may be performed by model selector 130, as shown in FIG. 1. After actual feedback is received from environment 200, model selector 130 may determine whether the actual feedback matches one of the predicted outcomes S1,1 to S1,k (or S1,j when only a subset of predicted outcome are used to train model M1 based on priority consideration). When the actual feedback matches one of the predicted outcome, e.g., S1,a, model selector 130 may select the corresponding candidate model M1,a and use it in a new training session without undergoing the training process using the actual feedback. In this way, the training process can be accelerated by using computational resources that would otherwise have remained idle. Thus, the disclosed embodiments improve the utilization of the available computational resources.

In some embodiments, the actual feedback may include an indicator of a reward received from environment 200 resulting from action A1. For example, assume that the action is a promotion for a financial product, such as credit card application, the feedback may take the form of the number of new applications received from customers during the promotion time period, such as a month. This number may be compared with the number of new applications without such a promotion, and the effect of the action (e.g., the promotion) may be evaluated (e.g., the increase in the number of new applications). Such effect may indicate a reward of the action, which may be used to train a model to take subsequent actions that maximize the reward.

It is to be understood that the configuration and boundaries of the functional building blocks of system 10 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 4:
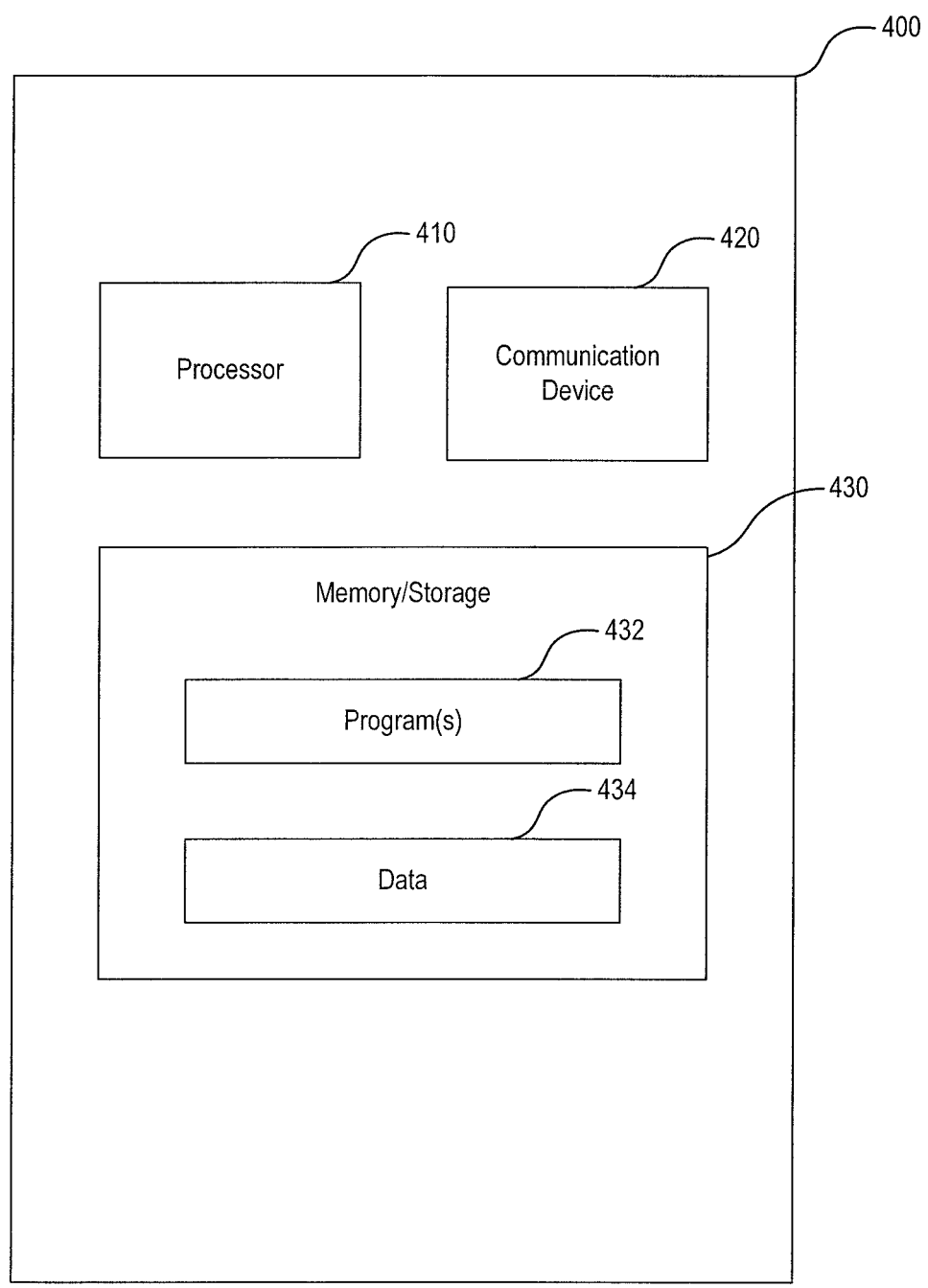
FIG. 4 is a block diagram of an exemplary computer system configured to implement components in the model training system shown in FIG. 1, consistent with the disclosed embodiments.

FIG. 4 shows a block diagram of an exemplary computer system 400 that may be associated with agent 100, consistent with the disclosed embodiments. Computer system 400 may practice the methods of accelerating model training disclosed herein. As shown in FIG. 4, computer system 400 may include one or more processors 410, one or more memories or storage devices 430 (also referred to as memory/storage 430 or memory 430 for simplicity), and one or more communication devices 420. In some embodiments, computer system 400 may take the form of a server, specially programmed computer, mainframe computer, laptop, smartphone, mobile device, or any combination of these components. In certain embodiments, computer system 400 (or a system including computer system 400) may be configured as a particular apparatus, system, or the like based on the storage, execution, and/or implementation of the software instructions that perform operations consistent with the disclosed embodiments. Computer system 400 may be a standalone system, or it may be a subsystem, which may be part of a larger system.

Processor 410 may include any number of processing devices, such as a microprocessor, a CPU, a GPU, a DSP, an FPGA, etc. Processor 410 may constitute a single-core or multiple-core processor that may execute parallel processes. For example, processor 410 may be a single-core processor configured with virtual processing technologies. In certain embodiments, processor 410 may use logical processors to execute and control multiple processes. Processor 410 may implement virtual machine technologies, or other known technologies to provide the ability to execute, control, run, manipulate, store, etc. multiple software processes, applications, programs, etc. In another embodiment, processor 410 may include a multiple-core processor arrangement (e.g., dual, quad core, etc.) configured to provide parallel processing functionalities to allow computer system 400 to execute multiple parallel processes. One of ordinary skill in the art would understand that other types of processor arrangements could be implemented that provide for the capabilities disclosed herein. The disclosed embodiments are not limited to any type of processor(s) configured in computer system 400.

Memory/storage 430 may include one or more storage devices configured to store instructions executable by processor 410 to perform operations associated with the disclosed embodiments. The disclosed embodiments are not limited to separate programs or computers configured to perform dedicated tasks. For example, memory/storage 430 may include a program 432 that performs the functions of computer system 400, or program 432 could comprise multiple programs. Additionally, processor 410 may execute one or more programs located remotely from computer system 400. For example, agent 100 may, via computer system 400 (or variants thereof), access one or more remote programs that, when executed, perform functions related to certain disclosed embodiments. In some embodiments, programs 432 may be stored in an external storage device, such as a cloud server located outside of computer system 400, and processor 410 may execute programs 432 remotely.

Programs executed by processor 410 may cause processor 410 to execute operations for accelerating model training by pre-training candidate model using predicted outcomes, according to the disclosed embodiments.

Memory/storage 430 may also store data 434 that may reflect any type of information in any format that system 10 may use to perform operations consistent with the disclosed embodiments. Memory/storage 430 may store instructions to enable processor 410 to execute applications, such as server applications, network communication processes, and any other type of application or software, including software directed to accelerating model training according to the disclosed embodiments. Alternatively, the instructions, application programs, etc., may be stored in an external storage in communication with computer system 400 via a network or any other suitable communication links. Memory/storage 430 may be a volatile or non-volatile, magnetic, semiconductor-based (e.g., EEPROM, flash memory, etc.), tape-based, optical, removable, non-removable, or other type of storage device or tangible (i.e., non-transitory) computer-readable medium.

Communication device 420 may include one or more devices configured to allow data to be received and/or transmitted by computer system 400. Communication device 420 may include one or more digital and/or analog devices that allow computer system 400 to communicate with other machines and devices, such as environment 200 of system 10 shown in FIG. 1. Computer system 400 may also include interface components for one or more input devices, such as keyboards, mouse devices, touch screens, and the like, which may enable computer system 400 to receive input from a user.

As discussed above, agent 100 may include at least one computer system 400. Computer system 400 may be a single server or may be configured as a distributed computer system including multiple servers or computers that interoperate to perform processes and functionalities associated with the disclosed embodiments.

Figure 5:
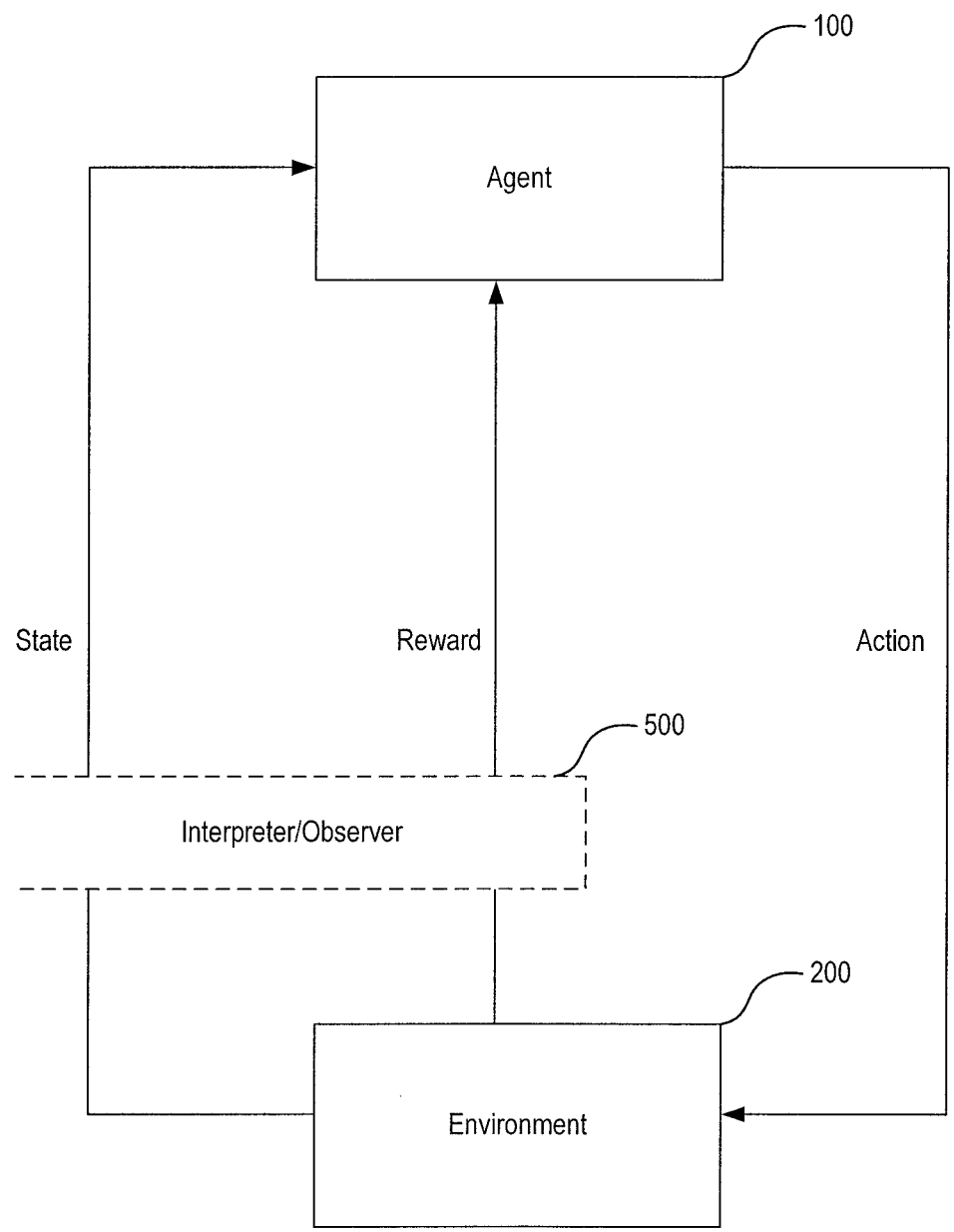
FIG. 5 shows an exemplary work flow of model training, consistent with the disclosed embodiments.

FIG. 5 illustrates an exemplary work flow for accelerating model training, consistent with the disclose embodiments. As shown in FIG. 5, agent 100 may, through a model subject to training, send an action to environment 200. Environment 200 may be in multiple states indicating different conditions or status of environment 200. Environment 200 may transit from one state to another state. The action may have certain effect on environment 200, which may change the state of environment 200. The effect may be interpreted, through an interpreter or observer 500, into a reward and a representation of the state of environment 200 after receiving the action, which are fed back to the agent for training (e.g., refining) the model. One objective may be to provide actions to environment 200 that may maximize the reward. In some cases, the feedback from environment 200 may take a relatively long time to materialize. To utilize the wait time for receiving the feedback, agent 100 may launch parallel training tasks based on predicted outcomes provided by behavior simulator 110 to pre-train a set of candidate models before the actual feedback may be received from environment 200. In this way, after the actual feedback is received, when the actual feedback matches one of the predicted outcomes, the candidate model corresponding to the matching outcome may have already been trained and may be readily usable in the next-stage training. The training process is thus accelerated.

The following process is an exemplary implementation of accelerating model training, consistent with the disclosed embodiments. The processes may be performed by various aspects and components of system 10 and computer system 400, as is apparent from the disclosure.

Figure 6:
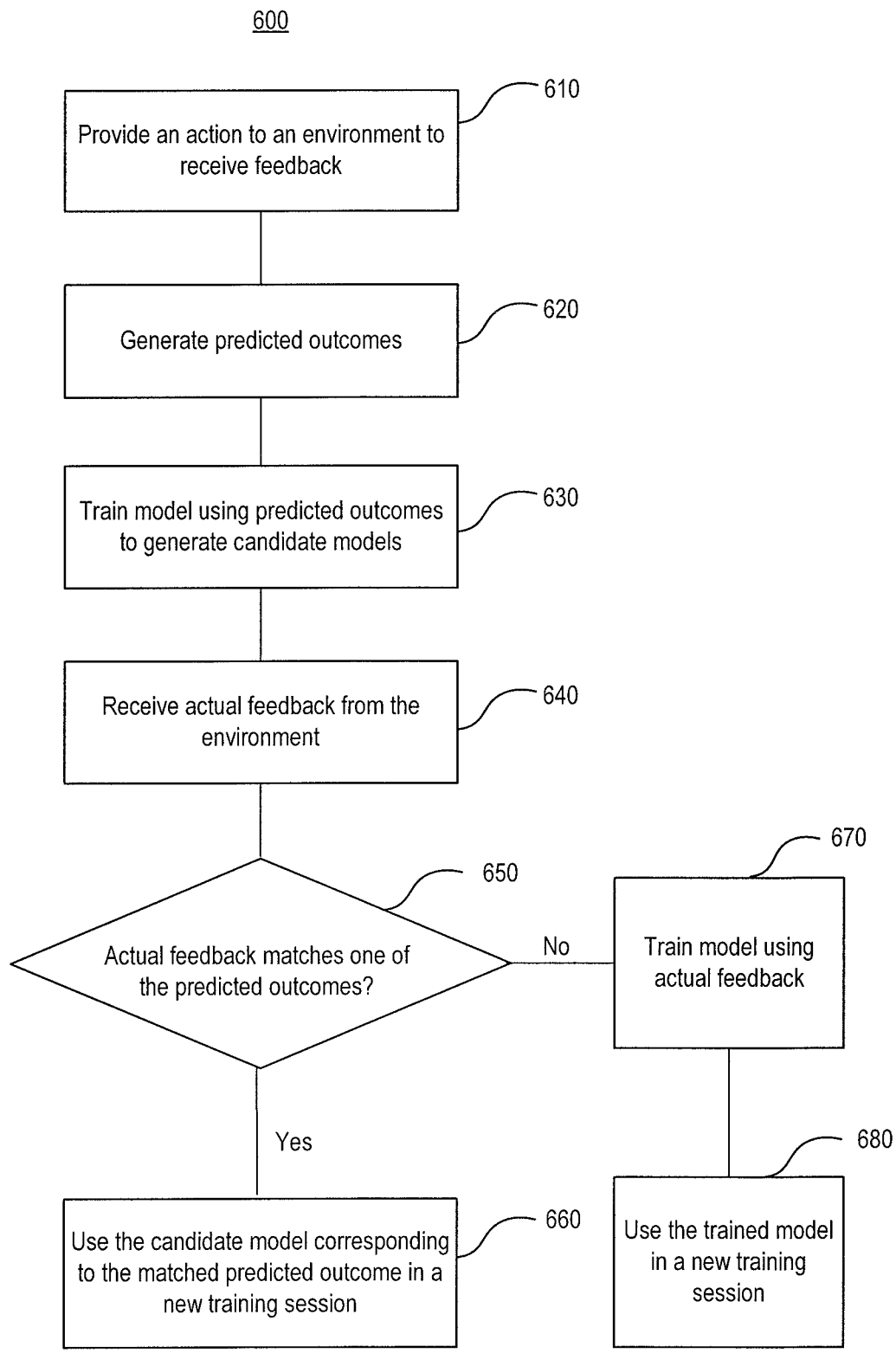
FIG. 6 is a flowchart of an exemplary process for training a model using machine learning, consistent with the disclosed embodiments.

FIG. 6 is a flowchart of an exemplary process 600 for training a model using machine learning, consistent with the disclosed embodiments. In step 610, the model, which may be hosted by agent 100, may provide an action (e.g., M1) to environment 200 to receive feedback. The action may include, for example, an advertisement, a promotion, a product design, a user interface, a financial service, etc. In step 620, behavior simulator 110 may generate predicted outcomes based on, for example, conditional probabilities taking into account the prior knowledge of environment 200 obtained from prior training sessions. The predicted outcomes may be further selected based on a priority associated with each predicted outcome, such as the likelihood or probability of the outcome or the expected value generated by training the model using the predicted outcome. In step 630, model trainer 130 may train the model using the predicted outcomes or using a selected subset of the predicted outcomes to generate candidate models. For example, model trainer 130 may launch parallel training tasks to train the model. In step 640, agent 100 may receive, through communication interface 140, actual feedback from environment 200. The actual feedback may indicate a reward received from environment 200 resulting from the action. In step 650, model selector 130 may determine whether the actual feedback matches one of the predicted outcomes. When the actual feedback matches one of the predicted outcomes, process 600 may proceed to step 660, in which agent 100 may use the candidate model corresponding to the matched predicted outcome in a new training session without the need for a model training process using the actual feedback, thereby accelerating the training process. When, however, none of the predicted outcomes matches the actual feedback, process 600 may proceed to step 670, in which model trainer 120 may train the model using the actual feedback. Then in step 680, agent 100 may use the model trained using the actual feedback in a new training session.

The disclosed techniques may be used in various applications. For example, in a system to evaluate and maximize advertisement effect, sample advertisements may be used as actions to send to a pool of target customers (e.g., an environment) to receive feedback. While waiting for the actual feedback, candidate models may be pre-trained based on predicted outcomes. Similarly, promotions may be used as actions to send to target customers, and the effect of the promotions may be simulated, based on which a model may be pre-trained while waiting for the actual feedback. A new product design, a new user interface, or a new financial service (e.g., a new credit card or a new feature relating to the credit card) may also be used as actions. Accelerations of model training in these applications may be similarly achieved using the techniques disclosed in this application.

The above-described processes may be implemented as a computer program or application or as a plugin module or sub-component of another application. Some of the described processes may be executed by computer system 400 as part of system 100. The described techniques may be varied and are not limited to the examples or descriptions provided.

Systems and methods disclosed herein may improve the functionality of agent 100. For example, the use of the behavior simulator 110 to predict likely outcomes and the use of the model trainer 120 to conduct parallel model training may improve the speed with which the model is trained.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which are non-exclusive. For example, aspects of the disclosed embodiments are described as being associated with data stored in memory, and one skilled in the art will appreciate that these aspects can be stored on and executed from many types of tangible computer-readable media, such as secondary storage devices, like hard disks, floppy disks, or CD-ROM, or other forms of RAM or ROM. Accordingly, the disclosed embodiments are not limited to the above described examples but instead are defined by the appended claims in light of their full scope of equivalents.

The invention claimed is:

1. A system for training a model using machine learning, based on feedback from an environment, the system comprising:
at least one processor; and
a storage medium storing instructions that, when executed by the at least one processor, cause the at least one processor to perform operations comprising:
providing, by the model in a training session, an action to the environment to receive the feedback from the environment;
generating, by a behavior simulator, a plurality of first predicted outcomes from the environment resulting from the action;
training the model, using at least a subset of the first predicted outcomes, to generate a first set of candidate models, wherein training is performed by utilizing cascading processing;
prioritizing cascade training based on a number of the first predicted outcomes in each level;
simulating, by the model in a training session, a new action to the environment to receive the feedback from the environment;
generating, by the behavior simulator, a second plurality of predicted outcomes from the new action, assuming that one or more of the first set of candidate models is an actual model that would be used in a next session;
training a new set of candidate models corresponding to the possible outcomes from the environment resulting from the new action, using at least a subset of the second predicted outcomes, to generate a second set of candidate models, wherein training is performed by utilizing cascading processing;
prioritizing the cascade training based on a number of the second predicted outcomes in each level;
receiving actual feedback from the environment, in response to the action;
determining whether the actual feedback matches one of the first predicted outcomes in the subset or one of the second predicted outcomes in the subset; and
accelerating the training session by not undergoing the training process using the actual feedback, in response to a positive determination; and using, in a new training session, a candidate model in the set corresponding to the matched predicted outcome.

2. The system of claim 1, wherein training the model comprises:
training the model using the subset of the predicted outcomes in parallel.

3. The system of claim 1, wherein training the model comprises:
selecting, from the predicted outcomes, a predicted outcome based on a priority associated with the predicted outcome; and
training the model using the selected predicted outcome.

4. The system of claim 3, wherein the priority indicates a likelihood that the action generates the predicted outcome in the environment.

5. The system of claim 3, wherein the priority indicates an expected value generated by training the model using the predicted outcome.

6. The system of claim 1, wherein generating the plurality of predicted outcomes comprises:
generating one of the plurality of predicted outcomes based on knowledge of the environment obtained from a prior training session.

7. The system of claim 6, wherein generating the plurality of predicted outcomes comprises:
generating one of the plurality of predicted outcomes based on a conditional probability representing a likelihood the environment generates the one of the plurality of the predicted outcomes resulting from the action, based on the knowledge of the environment obtained from the prior training session.

8. The system of claim 1, wherein generating the predicted outcomes comprises:
generating the predicted outcomes based on input from a user.

9. The system of claim 1, wherein the actual feedback comprises an indication of a reward received from the environment resulting from the action.

10. The system of claim 1, wherein the action comprises at least one of an advertisement, a promotion, a product design, a user interface, or a financial service.

11. A computer-implemented method for training a model using machine learning, based on feedback from an environment, the method comprising:
providing an action to the environment to receive the feedback from the environment;
generating a plurality of first predicted outcomes from the environment resulting from the action;
training the model, using at least a subset of the first predicted outcomes, to generate a first set of candidate models, wherein training is performed by utilizing cascading processing;
prioritizing cascade training based on a number of the first predicted outcomes in each level;
simulating a new action to the environment to receive the feedback from the environment;
generating a second plurality of predicted outcomes from the new action, assuming that one or more of the first set of candidate models is an actual model that would be used in a next session;
training a new set of candidate models corresponding to the possible outcomes from the environment resulting from the new action, using at least a subset of the second predicted outcomes, to generate a second set of candidate models, wherein training is performed by utilizing cascading processing;
prioritizing the cascade training based on a number of the second predicted outcomes in each level;
receiving actual feedback from the environment, in response to the action;
determining whether the actual feedback matches one of the first predicted outcomes in the subset or one of the second predicted outcomes in the subset; and
accelerating a training session by not undergoing the training process using the actual feedback, in response to a positive determination; and
using, in a new training session, a candidate model in the set corresponding to the matched predicted outcome.

12. The method of claim 11, wherein training the model comprises:
training the model using the subset of the predicted outcomes in parallel.

13. The method of claim 11, wherein training the model comprises:
selecting, from the predicted outcomes, a predicted outcome based on a priority associated with the predicted outcome; and
training the model using the selected predicted outcome.

14. The method of claim 13, wherein the priority indicates a likelihood that the action generates the predicted outcome in the environment.

15. The method of claim 13, wherein the priority indicates an expected value generated by training the model using the predicted outcome.

16. The method of claim 11, wherein generating the plurality of predicted outcomes comprises:
generating one of the plurality of predicted outcomes based on knowledge of the environment obtained from a prior training session.

17. The method of claim 16, wherein generating the plurality of predicted outcomes comprises:
generating the one of the plurality of predicted outcomes based on a conditional probability representing a likelihood the environment generates one of the plurality of the predicted outcomes resulting from the action, based on the knowledge of the environment obtained from the prior training session.

18. The method of claim 11, wherein generating the predicted outcomes comprises:
generating the predicted outcomes based on input from a user.

19. The method of claim 11, wherein the actual feedback comprises an indication of a reward received from the environment resulting from the action.

20. A non-transitory computer-readable medium storing instructions executable by at least one processor to cause the at least one processor to perform operations for training a model using machine learning, based on feedback from an environment, the operations comprising:
providing an action to the environment to receive the feedback from the environment;
generating a plurality of first predicted outcomes from the environment resulting from the action;
training the model, using at least a subset of the first predicted outcomes, to generate a first set of candidate models, wherein training is performed by utilizing cascading processing;
prioritizing cascade training based on a number of the first predicted outcomes in each level;
simulating a new action to the environment to receive the feedback from the environment;

generating a second plurality of predicted outcomes from the new action, assuming that one or more of the first set of candidate models is an actual model that would be used in a next session;

training a new set of candidate models corresponding to the possible outcomes from the environment resulting from the new action, using at least a subset of the second predicted outcomes, to generate a second set of candidate models, wherein training is performed by utilizing cascading processing;

prioritizing the cascade training based on a number of the second predicted outcomes in each level;

receiving actual feedback from the environment, in response to the action;

determining whether the actual feedback matches one of the first predicted outcomes in the subset or one of the second predicted outcomes in the subset; and accelerating a training session by not undergoing the training process using the actual feedback, in response to a positive determination; and using, in a new training session, a candidate model in the set corresponding to the matched predicted outcome.

\* \* \* \* \*